(12) United States Patent
Yao et al.

(10) Patent No.: US 12,446,607 B2
(45) Date of Patent: Oct. 21, 2025

(54) PROBIOTIC MICROCAPSULE AND PREPARATION METHOD THEREOF

(71) Applicant: Shaoxing Tongchuang Biotechnology Co., Ltd., Zhejiang (CN)

(72) Inventors: Mingfei Yao, Zhejiang (CN); Shengyi Han, Zhejiang (CN); Xin Jin, Zhejiang (CN); Weixin Huang, Zhejiang (CN); Jiaojiao Xie, Zhejiang (CN); Yanmeng Lu, Zhejiang (CN); Bona Wang, Zhejiang (CN); Ling Gao, Zhejiang (CN); Chihui Yu, Zhejiang (CN); Lanjuan Li, Zhejiang (CN)

(73) Assignee: Shaoxing Tongchuang Biotechnology Co., Ltd., Shaoxing (CN)

( * ) Notice: Subject to any disclaimer, the term of this patent is extended or adjusted under 35 U.S.C. 154(b) by 178 days.

(21) Appl. No.: 17/762,078

(22) PCT Filed: May 31, 2021

(86) PCT No.: PCT/CN2021/097408
§ 371 (c)(1),
(2) Date: Aug. 4, 2022

(87) PCT Pub. No.: WO2022/160540
PCT Pub. Date: Aug. 4, 2022

(65) Prior Publication Data
US 2024/0108047 A1    Apr. 4, 2024

(30) Foreign Application Priority Data
Feb. 1, 2021    (CN) .......................... 202110138512.4

(51) Int. Cl.
| A23L 33/135 | (2016.01) |
| A23L 29/212 | (2016.01) |
| A23L 29/262 | (2016.01) |
| A23L 29/275 | (2016.01) |
| A23P 10/30 | (2016.01) |
| A61K 9/48 | (2006.01) |
| A61K 9/50 | (2006.01) |
| A61K 35/00 | (2006.01) |
| A61K 35/747 | (2015.01) |

(52) U.S. Cl.
CPC ........... *A23L 33/135* (2016.08); *A23L 29/212* (2016.08); *A23L 29/262* (2016.08); *A23L 29/275* (2016.08); *A23P 10/30* (2016.08); *A61K 9/4808* (2013.01); *A61K 9/4866* (2013.01); *A61K 9/5036* (2013.01); *A61K 9/5089* (2013.01); *A61K 35/747* (2013.01); *A23V 2400/181* (2023.08); *A61K 2035/115* (2013.01)

(58) Field of Classification Search
CPC .. A61K 9/4808; A61K 9/4866; A61K 9/5036; A61K 9/5089; A61K 35/747; A61K 2035/115; A23L 33/135; A23L 29/262; A23L 29/275; A23L 29/212; A23P 10/30; A23V 2400/181
See application file for complete search history.

(56) References Cited

U.S. PATENT DOCUMENTS

| 2005/0266069 A1* | 12/2005 | Simmons ................ A23P 10/47 424/93.45 |
| 2010/0189767 A1* | 7/2010 | Shimoni .................. C12N 1/04 424/490 |
| 2015/0158004 A1* | 6/2015 | Meiners ................... B01J 13/22 264/4.6 |
| 2019/0125681 A1* | 5/2019 | Albed Alhnan ....... B33Y 50/02 |

FOREIGN PATENT DOCUMENTS

| CN | 103749973 A | 4/2014 |
| CN | 104664055 A | 6/2015 |
| CN | 105310080 A | 2/2016 |
| CN | 111493322 A | 8/2020 |
| WO | 2019144979 A1 | 8/2019 |
| WO | 2019191325 A1 | 10/2019 |

OTHER PUBLICATIONS

Wan et al,. "Spheronization conditions on spheroid shape and size" in International Journal of Pharmaceutics, 96 (1993) 59-65 (Year: 1003).*

* cited by examiner

*Primary Examiner* — Blessing M Fubara

(57) ABSTRACT

The invention provides a Probiotic microcapsule and a preparation method thereof, relating to the technical field of Probiotic products. The method includes the following steps: (a) preparing a capsule core containing Probiotics: mixing the capsule core materials including Probiotic powder, microcrystalline cellulose and starch, then adding a hydroxypropyl methylcellulose solution thereinto, while mixing evenly, making the obtained mixture materials into spherical particulate capsule cores by the extrusion spherization method; (b) coating by atomization: coating the microcapsule cores with a coating material solution in a single layer or multiple layers by atomization, getting core-shell microcapsules. The Probiotic microcapsules prepared by the present invention have a large encapsulation, uniform microcapsule particles, controllable particle size, storage-resistance, targetability to intestinal tracts, resistance to gastric acids and high temperature stability.

9 Claims, 2 Drawing Sheets

PROBIOTIC MICROCAPSULE AND PREPARATION METHOD THEREOF

FIELD OF THE INVENTION

The present invention relates to the technical field of probiotic products, in particular to a probiotic microcapsule and a preparation method thereof.

BACKGROUND OF THE INVENTION

Probiotics are a microorganism having beneficial effects on intestinal tracts, recognized by "Scientific Consensus of Probiotics" as "sufficient numbers, viable bacteria and beneficial health functions is of the core characteristics of Probiotics". "Viable bacteria" are a prerequisite for Probiotics to function. However, probiotics are very sensitive to environmental conditions, as the bacteria are not only easily oxidized, but also easily inactivated, after being ingested then passing through the complex upper digestive tract environment that contains gastric acids, bile salts and the likes.

At present, using microcapsules to pack Probiotics is one of the most effective methods to improve the survival ratio of viable bacteria at home and abroad. Many current preparation processes have certain limitations. For example, extrusion method results in low efficiency, with microcapsules produced in large particle size. The emulsification method requires a large amount of oil, resulting in difficulty in separation and cumbersome steps. The spray drying method causes a large number of viable bacteria to die. None of those methods is suitable to expand production.

SUMMARY OF THE INVENTION

The objective of the present invention is to provide a Probiotic microcapsule and a preparation method thereof. The Probiotic microcapsules prepared by the present invention have a large encapsulation, uniform microcapsule particles, controllable particle size, storage-resistance, targetabilily to intestinal tracts, resistance to gastric acids and high temperature stability.

The technical solution provided by the present invention is as follows.

A preparation method of Probiotic microcapsules includes the following steps:
(a) preparing a capsule core containing Probiotics:
mixing the capsule core materials including Probiotic powder, microcrystalline cellulose and starch, then adding a hydroxypropyl methylcellulose solution thereinto, while mixing evenly, making the obtained mixture materials into spherical particulate capsule cores by an extrusion spherization method,
(b) coating by atomization: coating the microcapsule cores with a coating material solution in a single layer or multiple layers by atomization, getting core-shell microcapsules.

The Probiotic powder mentioned above and below refers to lyophilized powder of Probiotics, including all bacterial species approved for use as first-generation Probiotics and second-generation Probiotics, which include, for example, but not limited to: *Lactobacillus plantarum, Bifidobacterium animalis, Lactobacillus casei, Lactobacillus paracasei, Bifidobacterium lactis, Bifidobacterium breve, Lactobacillus rhamnosus, Lactobacillus acidophilus, Lactobacillus phytofermentum. Leuconostoc mesenteroides, Lactobacillus salivarius, Lactobacillus helveticus, Lactobacillus reuteri, Lactobacillus gasseri, Lactobacillus crispatus, Lactobacillus johnsonii, Lactobacillus bulgaricus, Streptococcus thermophilus. Bifidobacterium longum, Bifidobacterium breve bacterium, Bifidobacterium infantis, Bifidobacterium bifidum* and *Bifidobacterium adolescentis*, etc.

In one embodiment, the capsule core materials further include skimmed milk powder.

In one embodiment, in step (a), the mass ratio of the Probiotic powder, the microcrystalline cellulose, and the starch is: 1-5:40-500:10-250.

Preferably, the starch includes porous starch or resistant starch.

In one embodiment, the mass ratio of the Probiotic powder, the microcrystalline cellulose, the starch, and skimmed milk powder is: 1-5:40-475:10-250:0-25.

In one embodiment, the mass ratio of the Probiotic powder and the hydroxypropyl methylcellulose is: 1-5:0.5-2.5.

In one embodiment, the extrusion spherization method includes the following steps: first extruding the mixture materials at a speed of 10-100 rpm, then spheroidizing them into spherical particles at a speed of 1500-2000 rpm.

In one embodiment, the concentration of the hydroxypropyl methylcellulose solution is 0.1-0.5 g/mL, preferably 0.2-0.4 g/mL.

In one embodiment, the conditions for coating by atomization are as follows: the atomization pressure of 0.1-0.5 mpa, preferably 0.2 mpa; wind speed at an air inlet of 20-25 $m^3$/h, preferably 22-23 $m^3$/h; wind speed at an air outlet of 20-25 $m^3$/h, preferably 22-23 $m^3$/h; temperature of 23-27° C., preferably 25° C.; the flow rate of the coating material solution set as 0.3 mL/min-0.6 mL/min, preferably 0.5 mL/min. In one embodiment, the duration for coating by atomization is 6-10 min.

In one embodiment, the steps followed by the step of coating by atomization further include the step of lyophilizing the coated Probiotic microcapsules.

In one embodiment, the diameter of the prepared microcapsule cores is 300 μm-1.2 mm, and the diameter of the core-shell microcapsules is 300 μm-2 mm.

In one embodiment, the coating materials may be one or more of hydroxypropyl methylcellulose (HPMC), gelatin, pectin, chitosan, xanthan gum, acacia, resistant starch, protein powder, polyvinyl chloride, cellulose acetate titanate, hydroxypropyl methylcellulose phthalate and polyvinyl alcohol titanate; preferably chitosan.

In one embodiment, the coating material solution is obtained by dissolving the coating materials in the hydroxypropyl methylcellulose solution; preferably, the mass concentration of the coating material solution ranges from 1-10%.

In one embodiment, before step (a), the preparation method further includes the step of preparing Probiotic powder; preferably, preparing the lyophilized powder of bacterial species by a lyophilizing method; more preferably, preparing the bacterial powder with the number of viable bacteria greater than $10^{11}$ CFU/g.

The present invention also provides a Probiotic microcapsule, which is prepared by the above-mentioned preparation method.

The invention also provides the application of the Probiotic microcapsules in the preparation of Probiotic food or health products.

The present invention has the following beneficial effects.

The preparation method of Probiotic microcapsules provided by the present invention is of simplicity and high manipulability in process, and has short process time and stable quality in batch with almost no difference.

The Probiotic microcapsules prepared by the present invention have a large encapsulation, uniform microcapsule particles, controllable particle size, storage-resistance, targetability to intestinal tracts, resistance to gastric acids and high temperature stability, so they are suitable for the industrial production of Probiotics as health products or medicines.

BRIEF DESCRIPTION OF THE DRAWINGS

In order to more clearly describe the specific embodiments of the present invention or the technical solutions in the prior art, the drawings are briefly described, which need to be used in the specific embodiments or the description of the prior art. It is obvious for a person skilled in the art to obtain other drawings without creative work, based on such drawings described below that pertain to some embodiments of the present invention.

DETAILED DESCRIPTION OF SOME EMBODIMENTS

The technical solutions of the present invention will be clearly and completely described as follows in combination with such embodiments that are obviously described as a part of the embodiments of the present invention, but not all of the embodiments. Based on the embodiments of the present invention, all other embodiments obtained by a person skilled in the art without creative work shall fall within the protection scope of the present invention.

Example 1

1. Preparing the Microcapsules of *Lactobacillus salivarius* Li01

(1) Preparing lyophilized powder of *Lactobacillus*. The *Lactobacillus* is cultured by means of a fermenter by adopting the existing technology, and lyophilized to obtain the lyophilized powder of *Lactobacillus salivarius* Li01, in which the number of Li01 viable bacteria is greater than $10^{11}$ CFU/g.

(2) compounding Probiotic microcapsule materials: 1 g of lyophilized powder of Li01 Probiotics, 40 g of microcrystalline cellulose and 10 g of starch are weighed and mixed to prepare Material A.

1 g of HPMC is weighed and added into 50 mL of is warm water above 60° C., while mixing evenly, so as to make Solution B with a concentration of 0.2 g/mL, then B is laid aside to be cooled to room temperature. The mixed powder A is put into the tray, into which Solution B is poured in multiple times up to 25 mL in total, while mixing evenly. This step and the following preparation process need to be completed in a clean room (cleanness of a ten-thousand rank).

(3) Preparing the capsule core by the extrusion spherization method: The mixed materials are extruded at a speed of 36 rpm and spheronized into spherical particles at a speed of 1800 rpm by using an extrusion plate with a diameter of 1 mm.

(4) Preparing a coating liquid: 4 g of chitosan is dissolved in Liquid B to prepare a coating liquid.

(5) Coating microcapsules. 50 g of capsule cores are taken to coat.

The air inlet speed is adjusted to 22-23 $m^3$/h, the temperature to 25° C., the flows rate of the coating solution to 0.5 mL/min, and the coating time to 6-10 min.

The coated microcapsules of *Lactobacillus salivarius* Li01 are lyophilized to make end products.

2. Characteristics and Evaluation of the Microcapsules of *Lactobacillus salivarius* Li01

(1) Morphology: The prepared capsule cores have a diameter of about 1 mm and a uniform size; the prepared *Lactobacillus* microcapsules have little change in size before and after coating.

Figure 1:
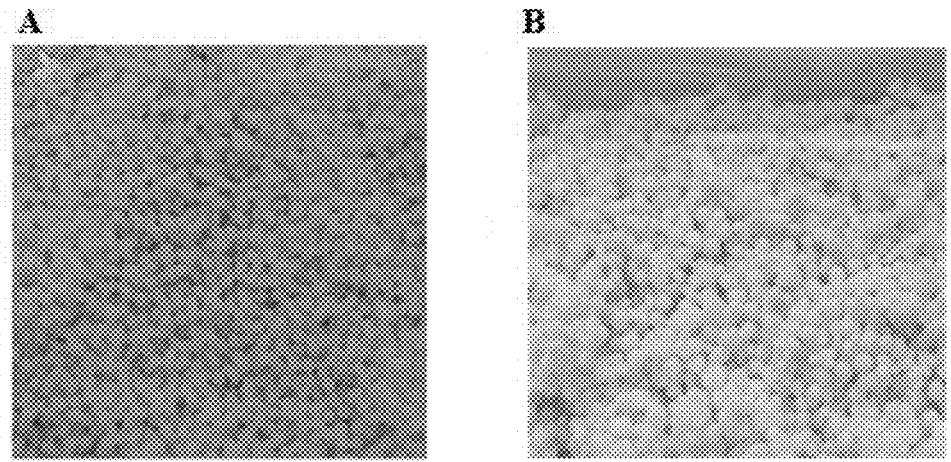
FIG. 1 shows a morphological structure of the microcapsules of *Lactobacillus salivarius* Li01 provided in Example 1 of the present invention (where FIG. A shows the microcapsule cores before coating, and FIG. B shores the microcapsule after coating).

FIG. 1 shows a morphological structure of the microcapsules of *Lactobacillus salivarius* Li01 provided in this example (where FIG. A shows the microcapsule cores before coating, and FIG. B shows the microcapsule after coating). The change in particle size is small.

(2) Encapsulation ratio of Probiotics:

The microcapsules are slightly crushed to prepare the suspension, which is counted by a plate counting method to determine the encapsulation ratio of Probiotics. The encapsulation ratio of the *Lactobacillus* microcapsules is determined to be greater than 97%.

(3) Resistance of Probiotics:

A. The Survival Ratio of Probiotics (*Lactobacillus*) is Determined in Simulated Gastric Acids (pH 2.0) and Simulated Intestinal Juice (pH 6.5).

Figure 2:
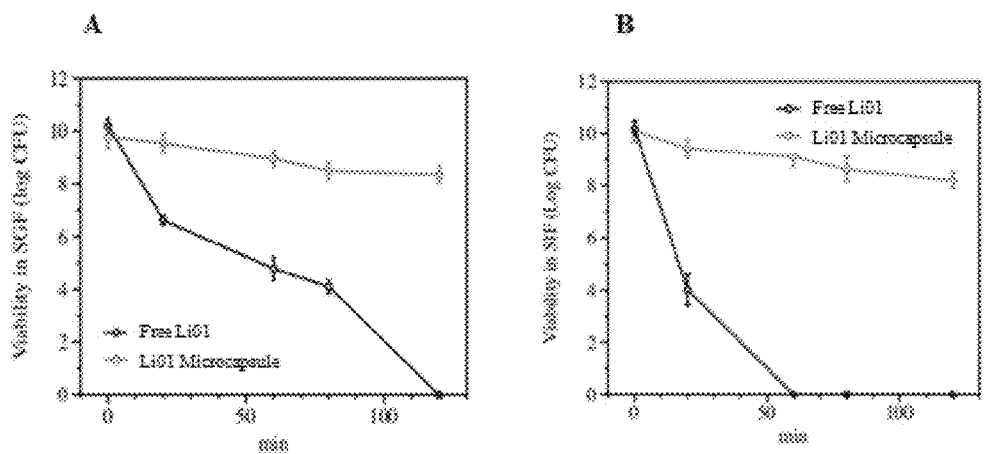
FIG. 2 shows resistance test results of the microcapsules of *Lactobacillus salivarius* Li01 provided in Example 1 of the present invention (where FIG. A shows the measurement performed in a gastric acid-simulating environment, and FIG. B shows a measurement performed in an intestinal juice-simulating environment).

FIG. 2 shows resistance test results of the microcapsules of *Lactobacillus salivarius* Li01 provided in Example 1 of the present invention (where FIG. A shows the measurement performed in a gastric acid-simulating environment, and FIG. B shows a measurement performed in an intestinal juice-simulating environment).

Figure 3:
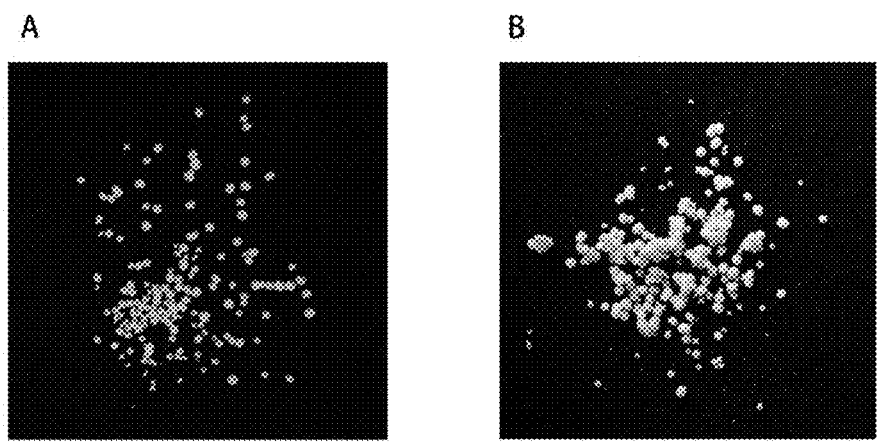
FIG. 3 shows a morphological structure of the microcapsules of *Lactobacillus salivarius* Li05 provided in Example 2 of the present invention (where FIG. A shows the microcapsule cores before coating, and FIG. B shores the microcapsule after coating).

FIG. 3 shows a morphological structure of the microcapsules of *Lactobacillus salivarius* Li05 provided in Example 2 of the present invention (where FIG. A shows the microcapsule cores before coating, and FIG. B shows the microcapsule after coating).

The results show that:

compared with the non-microencapsulated *Lactobacillus salivarius* Li01 (Free Li01), the microencapsulated *Lactobacillus salivarius* Li01 (Li01 microcapsule) has a higher survival ratio under the environment of gastric acids and intestinal juices.

B. Survival Ratio in High Temperature (63° C.) Test

| Group | Time | | | | |
|---|---|---|---|---|---|
| | 0 min | 5 min | 10 min | 20 min | 40 min |
| Li01 microcapsule (CFU/g) | $9.8*10^9$ | $8.4*10^8$ | $8.3*10^7$ | $6.2*10^5$ | $3.1*10^3$ |
| Free Li01 (CFU/g) | $2.4*10^{10}$ | 4700 | 0 | 0 | 0 |

The results show that:

compared with the non-microencapsulated *Lactobacillus salivarius* Li01 (Free Li01), the microencapsulated *Lactobacillus salivarius* Li01 (Li01 microcapsule) has a higher survival ratio in high temperature environment, and the higher survival ratio will exist regardless of how long within 10-40 min at high temperature.

Other Properties:

Of the Li01 microcapsules prepared in Example 1 of the present invention, 100 mg is dissolved in physiological saline and poured in the stomach, then can colonize in the intestinal tract within 14 hours.

Example 2

1. Preparing the Microcapsules of *Lactobacillus salivarius* Li05

(1) Preparing lyophilized powder of *Lactobacillus salivarius*. The *Lactobacillus salivarius* Li05 is cultured by means of a fermenter by adopting the existing technology, and lyophilized to obtain the lyophilized powder (100 g), in which the number of viable bacteria of *Pediococcus pentosaceus* Li05 is greater than $10^{11}$ CFU/g.

(2) compounding Probiotic microcapsule materials: 2 g of lyophilized powder of Li05 Probiotics, 80 g of microcrystalline cellulose and 20 g of starch are weighed and mixed to prepare Material A.

1 g of HPMC is weighed and added into 50 mL of warm water above 60° C., while mixing evenly, so as to make Solution B with a concentration of 2 g/mL, then B is laid aside to be cooled to room temperature. The mixed powder A is put into the tray, into which Solution B is poured in multiple times up to 52 mL in total, while mixing evenly. This step and the following preparation process need to be completed in a clean room (cleanness of a ten-thousand rank).

(3) Preparing the capsule core by the extrusion spherization method: The mixed materials are extruded at a speed of 40 rpm and spheronized into spherical particles at a speed of 1700 rpm by using an extrusion plate with a diameter of 1 mm.

(4) Preparing a coating liquid: 2 g of chitosan is dissolved in Liquid B to prepare a coating liquid.

(5) Coating microcapsules: 50 g of capsule cores are taken to coat.

The air inlet speed is adjusted to 22 m³/h, the temperature to 25° C., the flow rate of the coating solution to 0.4 mL/min, and the coating time to 8 min.

The coated microcapsules of *Lactobacillus salivarius* Li05 are lyophilized to make end products.

2. Characteristics and Evaluation of the Microcapsules of *Lactobacillus salivarius* Li05

(1) Morphology: The prepared capsule cores have a diameter of about 1 mm and a uniform size; the prepared *Lactobacillus* microcapsules have little change in size before and after coating.

FIG. 3 shows a morphological structure of the microcapsules of *Lactobacillus salivarius* Li05 provided in this example (where FIG. A shows the microcapsule cores before coating, and FIG. B shores the microcapsule after coating). The change in particle size is small.

(2) Encapsulation ratio of Probiotics:

The microcapsules are slightly crushed to prepare the suspension, which is counted by a plate counting method to determine the encapsulation ratio of Probiotics. The encapsulation ratio of the *Lactobacillus* microcapsules is determined to be greater than 99%.

(3) Resistance of Probiotics:

a. The Survival Ratio of Probiotics (*Lactobacillus*) is Determined in Simulated Gastric Acids (pH 2.0) and Simulated Intestinal Juices (pH 6.5).

Figure 4:
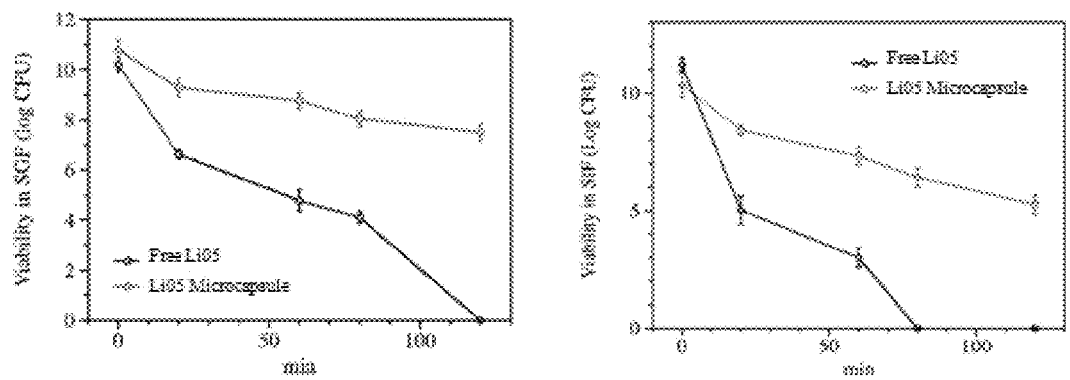
FIG. 4 shows resistance test results of the microcapsules of *Lactobacillus salivarius* Li05 provided in Example 2 of the present invention (where FIG. A shows the measurement performed in a gastric acid-simulating environment, and FIG. B shows a measurement performed in an intestinal juice-simulating environment).

FIG. 4 shows resistance test results of the microcapsules of *Lactobacillus salivarius* Li05 provided in Example 2 of the present invention (where FIG. A shows the measurement performed in a gastric acid-simulating environment, and FIG. B shows a measurement performed in an intestinal juice-simulating environment).

The results show that: compared with free Li05. Li05 microcapsules have significantly improved stability and increased resistance to acids and bile salts. Compared with the microcapsules on the market, the microcapsules prepared by this method have round particles, a high encapsulation ratio, uniform size, and almost no loss of Probiotics during coating processes.

Finally, it should be noted that the above embodiments are only used to describe the technical solutions of the present invention, not to limit them. Although the present invention has been described in detail with reference to the foregoing embodiments, a person skilled in the art should understand that she/he can still make the modifications to the technical solutions described in the foregoing embodiments, or the equivalent replacements to some or all of the technical features, none of which causes the essence of the corresponding technical solutions to deviate from the technical solutions of the embodiments in the present invention.

What is claimed is:

1. A preparation method of probiotic microcapsules, comprising the following steps:

(a) preparing a capsule core containing probiotics: mixing capsule core materials including probiotic powder, microcrystalline cellulose and starch, adding a hydroxypropyl methylcellulose solution, making the obtained mixture materials into spherical particulate capsule cores by an extrusion spherization method;

(b) coating by atomization: coating the capsule core with a coating material solution in a single layer or multiple layers by atomization, obtaining core-shell microcapsules, wherein in step (b):

atomization pressure of 0.1-0.5 mpa is applied, wherein a wind speed at an air inlet is 20-25 m³/h, wherein a wind speed at an air outlet is 20-25 m³/h, wherein temperature is 23-27° C., and wherein a flow rate of the coating material solution is 0.3 mL/min-0.6 mL/min.

2. The preparation method according to claim 1, wherein in step (a), the extrusion spherization method includes the following steps: extruding the obtained mixture materials at a speed of 10-100 rpm, spheroidizing the obtained mixture materials into the spherical particulate capsule cores at a speed of 1500-2000 rpm.

3. The preparation method according to claim 1, wherein the capsule core materials further include skimmed milk powder.

4. The preparation method according to claim 3, wherein in step (a), mass ratio of the probiotic powder, the microcrystalline cellulose, the starch and the skimmed milk powder is 1-5:40-500:20-250:10-25.

5. The preparation method according to claim 1, wherein in step (a), mass ratio of the probiotic powder, the microcrystalline cellulose, the starch and the skimmed milk powder is 1-5:40-500:20-250:10-25.

6. The preparation method according to claim 1, wherein in step (a), mass ratio of the probiotic powder and the hydroxypropyl methylcellulose is 1-5:0.5-2.5, and concentration of the hydroxypropyl methylcellulose solution is 0.1-0.5 g/mL.

7. The preparation method according to claim 1, wherein the coating material solution is obtained by dissolving coating materials in the hydroxypropyl methylcellulose solution, wherein mass concentration of said coating material solution is 1-10%.

8. The preparation method according to claim 7, wherein the coating materials comprises one or more of hydroxypropyl methylcellulose, gelatin, pectin, chitosan, xanthan gum, acacia, resistant starch, protein powder, polyvinyl chloride, cellulose acetate titanate, hydroxypropyl methylcellulose phthalate and polyvinyl alcohol titanate; preferably chitosan.

9. The preparation method according to claim 1, further comprising a step of preparing a lyophilized probiotic powder of bacterial species by a lyophilizing method; preparing the lyophilized probiotic powder with a number of viable bacteria greater than $10^{11}$ CFU/g.

* * * * *